(12) United States Patent
Podgorney

(10) Patent No.: US 6,203,097 B1
(45) Date of Patent: Mar. 20, 2001

(54) FOLDING TRAILER WITH BED SUPPORT MECHANISM OPERATED FROM A STANDING POSITION

(75) Inventor: Thomas R. Podgorney, Conemaugh, PA (US)

(73) Assignee: Fleetwood Folding Trailers, Inc., Somerset, PA (US)

( * ) Notice: Subject to any disclaimer, the term of this patent is extended or adjusted under 35 U.S.C. 154(b) by 0 days.

(21) Appl. No.: 09/593,873

(22) Filed: Jun. 14, 2000

(51) Int. Cl.[7] .................................................... B60R 15/00
(52) U.S. Cl. ................................................. 296/170; 5/119
(58) Field of Search .......................... 296/170, 174, 296/169, 168, 173, 165, 26.15, 26.12, 26.13, 26.08, 26.09, 26.11; 108/47, 46; 312/277, 330.1, 316, 317.3; 5/119

(56) References Cited

U.S. PATENT DOCUMENTS

| | | | |
|---|---|---|---|
| 3,475,047 | * 10/1969 | Daniels | 296/170 |
| 3,675,885 | 7/1972 | Shute | 248/351 |
| 3,675,965 | 7/1972 | Burdett | 296/23 |
| 3,680,908 | * 8/1972 | Bowen | 296/170 |
| 3,709,551 | * 1/1973 | McCarthy | 296/170 |
| 5,161,851 | * 11/1992 | Rafi-Zadeh | 296/165 X |

OTHER PUBLICATIONS

Portion of catalog of TrailManor Corp., Lake City, Tennessee (1988), 3 pp.
Coleman Camping Trailers, Models 380, 381, 382, 390 Set–up Instructions and Maintenance Guide, 1969, 4 pp.
Coleman Camping Trailers, Set–up Instructions and Maintenance Guide, 1968, 4 pp.
Coleman Drawing Sheet, 1968 & 1969, 1 sheet.

* cited by examiner

Primary Examiner—D. Glenn Dayoan
Assistant Examiner—Lori L. Coletta
(74) Attorney, Agent, or Firm—Webb Ziesenheim Logsdon Orkin & Hanson, P.C.

(57) ABSTRACT

A folding camping trailer includes a trailer body having an end wall. An expandable bed is movable between a closed position retracted within the trailer body and an opened position extended outward from the end wall. The expandable bed includes a bed support mechanism attached to an underside of the expandable bed. The bed support mechanism is configured to connect to the end wall of the trailer body or to a towing frame of the folding trailer for supporting the expandable bed in a vertical direction when the expandable bed is in the opened position.

20 Claims, 9 Drawing Sheets

FOLDING TRAILER WITH BED SUPPORT MECHANISM OPERATED FROM A STANDING POSITION

BACKGROUND OF THE INVENTION

1. Field of the Invention

The present invention relates to folding camping trailers having expandable beds and, more particularly, to a bed support mechanism for expandable beds in a folding camping trailer.

2. Description of the Prior Art

Folding camping trailers typically have a trailer body with an extendable hard-shell top portion. In addition, the trailer body usually includes two expandable beds that extend slidably outward from end walls of the trailer body. The expandable beds provide a usable sleeping area that is larger than the living area defined by the trailer body alone. Prior to the use of expandable beds in folding camping trailers, the sleeping area of the beds in folding camping trailers was generally constrained by the living area defined by the trailer body. The expandable beds, when extended outward from the end walls of the trailer body to their opened position, typically each require a support structure that extends between the expandable beds and the trailer body.

One known support structure for supporting expandable beds in the opened position is detachable poles. The detachable poles each connect at one end to an underside of the expandable beds and connect at the other end to the trailer body. However, this arrangement has significant disadvantages. First, the detachable poles must be housed within the trailer body until it is time to set up the expandable beds. Because the poles are not attached to the expandable beds or to the trailer body, they can easily become misplaced or damaged. In addition, the detachable poles are difficult to install. After extending one of the expandable beds, the user of the folding camping trailer connects one end of the detachable pole to a bracket or other connecting structure located on the underside of the expandable bed. After one end of the detachable pole is in place, the user of the folding camping trailer must position himself or herself underneath the expandable bed and push upward with his or her back or head so that the second end of the detachable pole may be attached to a connecting structure located on the trailer body. This step in the set up process is particularly labor intensive and requires a significant degree of muscle strength. In addition, a similar labor intensive procedure must be followed in reverse to disassemble the expandable bed.

Another known prior art solution also utilizes poles or posts as the support structure for the expandable beds, but permanently attaches both ends of the poles to the folding camping trailer. The first end of each of the poles is connected to the underside of the expandable beds and the second end of each of the poles is connected to the trailer body. Specifically, in this prior art arrangement, the first end of each of the poles includes a roller that is rotatably received in a groove or track formed in the underside of the expandable beds. The second end of the each of the poles is pivotally connected to the trailer body. An advantage of this arrangement is that the poles are always attached to the expandable beds whether the expandable beds are in the closed or opened position. Thus, the poles cannot be misplaced and set up of the expandable beds is simplified. However, the roller-track configuration by which the "roller" end of the poles is connected to the expandable beds is expensive to manufacture. In addition, the roller end of the poles often jams in the track formed in the underside of the expandable beds.

In view of the foregoing, it is an object of the present invention to provide a folding camping trailer with expandable beds having a simplified and cost-effective bed support apparatus for supporting the expandable beds in the opened position. In addition, it is an object of the present invention to provide a bed support apparatus for expandable beds in a folding camping trailer that makes set up of the expandable beds easier and less labor intensive. It is a further object of the present invention to generally overcome the disadvantages present in prior art bed support arrangements.

SUMMARY OF THE INVENTION

The above objects are accomplished with a folding camping trailer having an expandable bed with a bed support mechanism in accordance with the present invention. The folding camping trailer of the present invention includes a trailer body having an end wall and a towing frame. An expandable bed is movable between a closed position retracted within the trailer body and an opened position extended outward from the end wall. A bed support mechanism is attached to the bottom side of the expandable bed for supporting the expandable bed in a vertical direction when the expandable bed is in the opened position. The bed support mechanism includes a first member having two opposing flanges defining a recess therebetween. The flanges further define opposing longitudinally extending slots. The bed support mechanism further includes a second member having an elongated portion and a handle portion. The elongated portion of the second member is pivotally connected to the first member and positioned within the recess. The handle portion projects outward from the first member for manipulation by a user of the folding camping trailer. Furthermore, the bed support mechanism includes an elongated bed support member having a first end and a second end. The first end is pivotally and slidably connected to the first member by a pin passing through the first end and the slots defined by the flanges. The second end is configured for removable attachment to the trailer body with the expandable bed in the opened position. In a first position of the second member, the pin is free to slide in the slots defined by the flanges. In a second position of the second member, the elongated portion of the second member interacts with the pin passing through the first end of the bed support member to prevent the pin from sliding in the slots defined by the flanges.

An elastomeric bushing may be located at each end of the pin such that with the second member in the first position, the bed support member is pivotal laterally with respect to a central longitudinal axis of the first member. A fastener may be located at each end of the pin for retaining the elastomeric bushings on the pin and securing the bed support member to the first member. A pair of spacer bushings may be received on the pin and positioned in the recess. The spacer bushings are preferably positioned on opposite sides of the first end of the bed support member. In addition, with the second member in the second position, the elongated portion of the second member engages spacer bushings which substantially prevent the pivotal lateral movement of the bed support member.

The first member and the elongated portion of the second member may be formed as cooperating U-shaped channels. The handle portion of the second member may be a latch plate forming an angle with the elongated portion. The bed support member is preferably a rod having an annular cross section. The second end of the bed support member may be configured to removably attach to the end wall of the trailer body. The second end of the bed support member may also be configured to removably attach to the towing frame.

Further details and advantages of the present invention will become apparent from the following detailed description, in conjunction with the drawings.

DETAILED DESCRIPTION OF THE PREFERRED EMBODIMENTS

Figure 1:
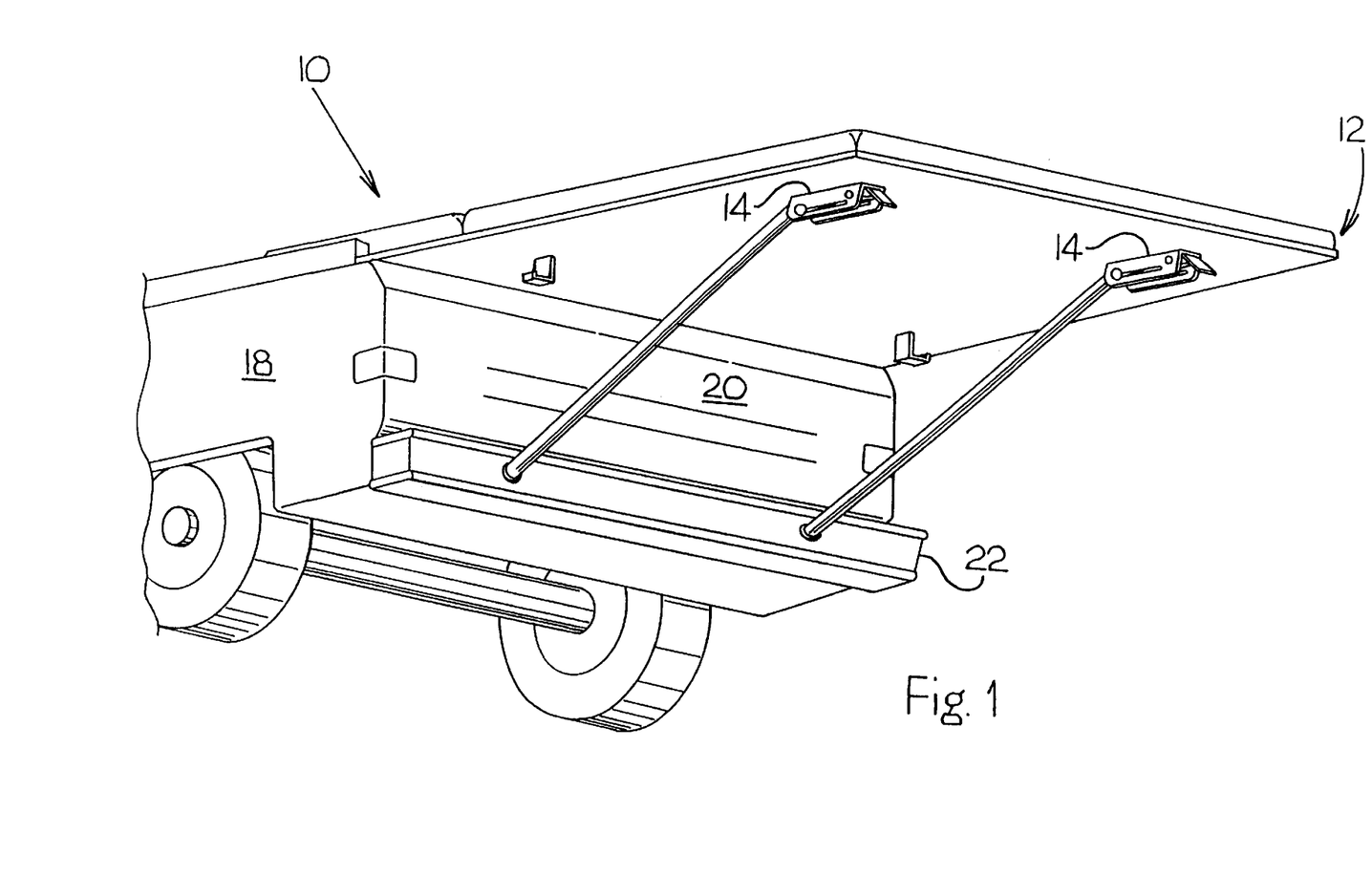
FIG. 1 is a perspective end view of a folding camping trailer with expandable beds showing one of the expandable beds and having a pair of bed support mechanisms in accordance with the present invention.
Figure 2:
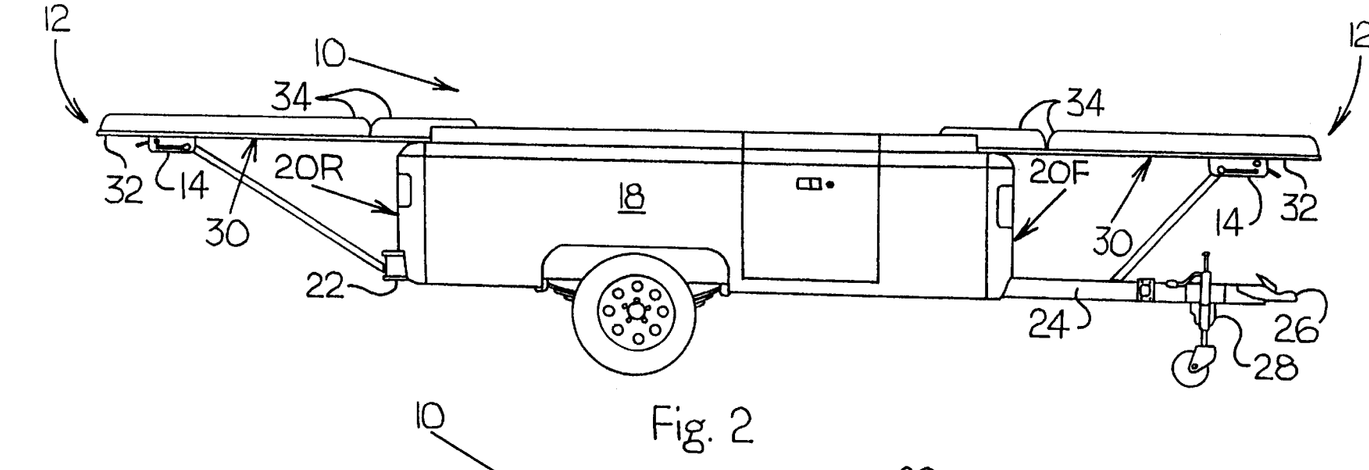
FIG. 2 is an elevational side view of the folding camping trailer of FIG. 1 showing the expandable beds in an opened position and the bed support mechanisms in a set tip position.
Figure 3:
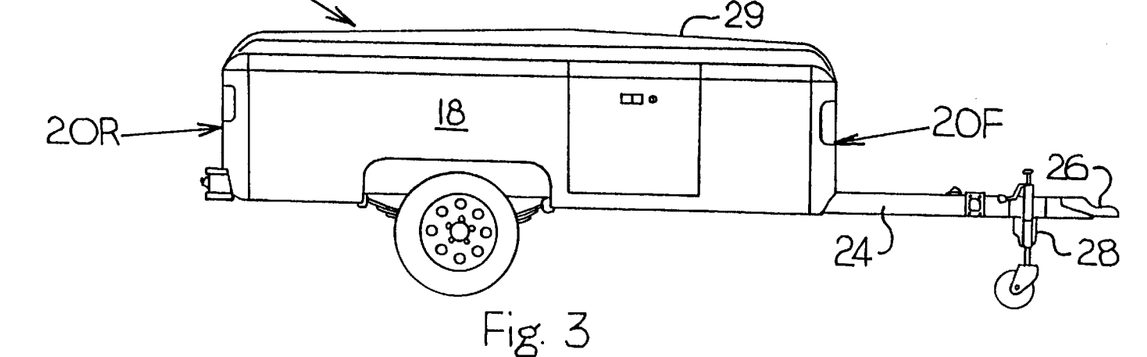
FIG. 3 is an elevational side view of the folding camping trailer of FIG. 1 showing the folding camping trailer in a closed position.

FIGS. 1–3 generally show a folding camping trailer 10 (hereinafter "folding trailer 10") having expandable beds 12 supported by bed support mechanisms 14 (hereinafter "bed supports 14") in accordance with the present invention. The folding trailer 10 includes a trailer body 16 having a rectangular shape. The trailer body 16 is defined by two longitudinal sidewalls 18 and two end walls 20, a front end wall 20F and a rear end wall 20R. The expandable beds 12 extend slidably outward from the end walls 20 as is well known in the art. The trailer body 16 further includes a bumper 22 extending from the rear end wall 20R. The trailer body 16 also includes a towing frame 24 that extends outward from the front end wall 20F. The towing frame 24 may include a towing hitch 26 for towing the folding trailer 10. An extendable support wheel 28 is preferably attached to the towing frame 24 to support the towing frame 24 in the set up configuration of the folding trailer 10. As is well known in the art, the trailer body 16 preferably includes an extendable hard-shell top portion 29 that extends upward from the trailer body 16 and typically includes a flexible tent or canopy (not shown) which encloses an internal living space of the folding trailer 10.

The expandable beds 12 are shown in FIG. 2 in their extended or opened position extending outward from the front and rear end walls 20F, 20R of the trailer body 16. The expandable beds 12 in their opened position are cantilevered outward from the front and rear end walls 20F, 20R of the trailer body 16 and, due to their length, typically require extra support in the vertical direction. The bed supports 14 of the present invention extend between an underside 30 of the expandable beds 12 and the respective front and rear end walls 20F, 20R of the trailer body 16 to provide additional support for the expandable beds 12. The expandable beds 12 preferably each further include a bed platform 32 and a mattress 34 positioned thereon. The bottom surface of the bed platform 32 defines the underside 30 of the expandable beds 12. In a closed position of the expandable beds 12, the expandable beds 12 are retracted into the trailer body 16 and are supported by the trailer body 16.

Figure 4:
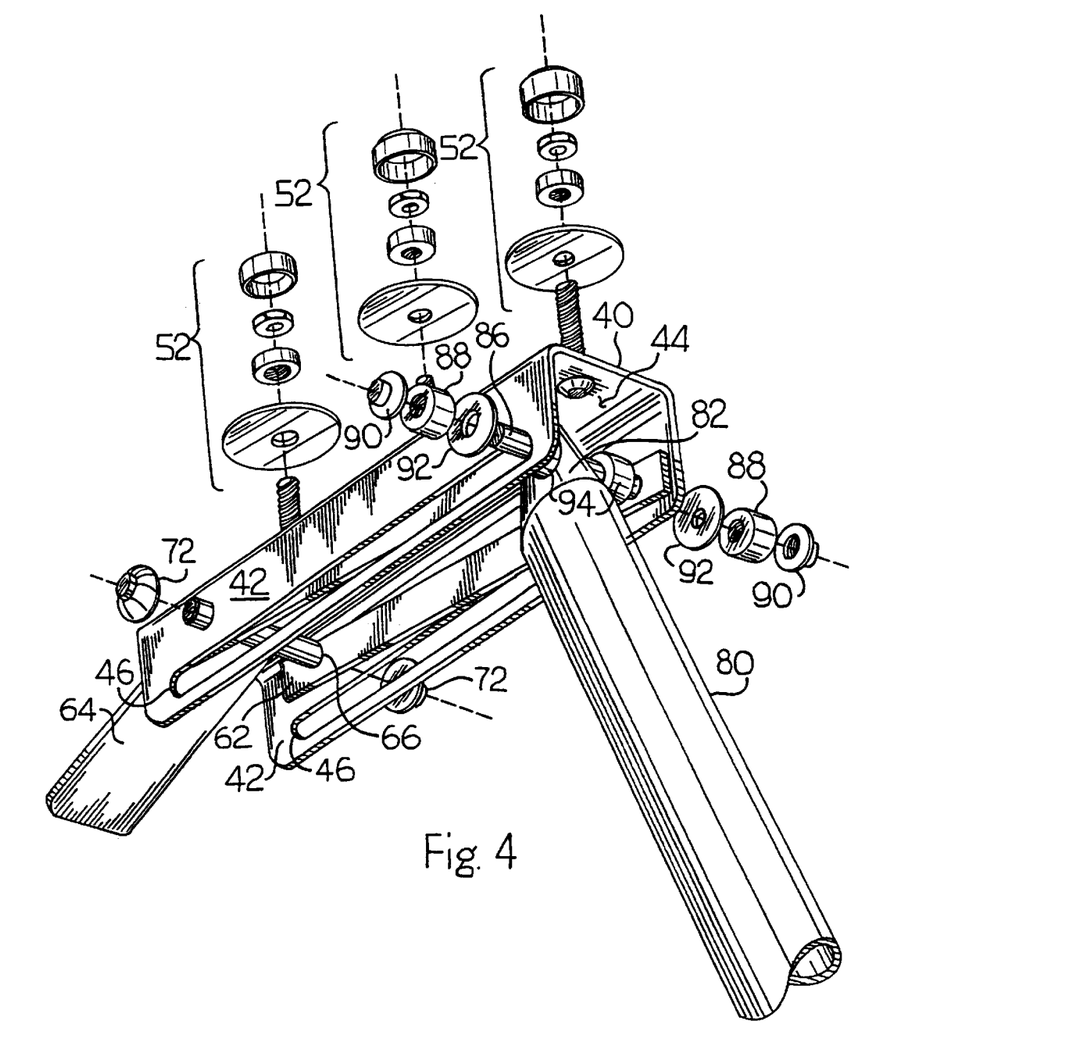
FIG. 4 is an exploded perspective view of a bed support mechanism in accordance with the present invention.
Figure 5:
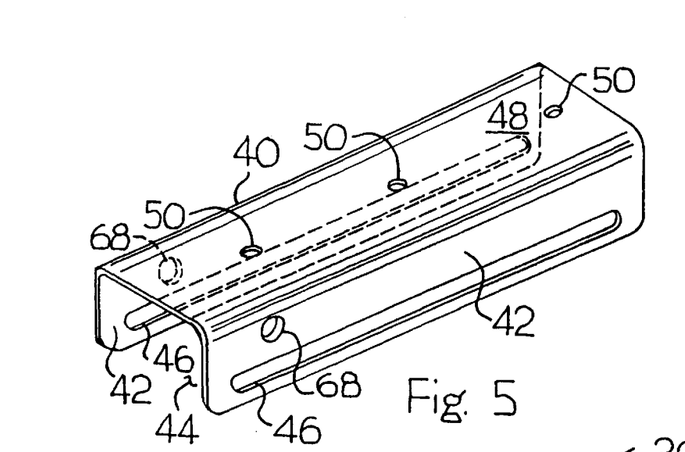
FIG. 5 is a perspective view of a first member of the bed support mechanism of FIG. 4.

Referring now to FIGS. 4–8, the bed supports 14 each include an outer U-shaped channel or first member 40 having two opposing flanges 42 defining a recess 44 therebetween. The flanges 42 further define opposing and longitudinally extending slots 46. A connecting portion 48 between the two flanges 42 defines a plurality of holes 50 for fastener groups 52 that are preferably used to connect the first member 40 to the underside 30 of the expandable beds 12. The fastener groups 52 each typically include a machine screw, a pair of washers, a nut and a snap cap as shown in FIG. 4, but other equivalent mechanical fasteners may also be used.

Figure 6:
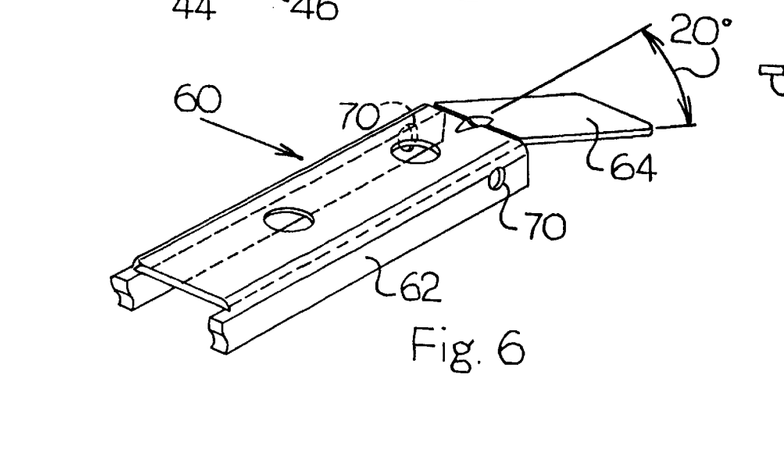
FIG. 6 is a perspective view of a second member of the bed support mechanism of FIG. 4.

The bed supports 14 each further include a second member 60 having an is elongated portion 62, preferably formed as a U-shaped channel, and a handle portion 64. The elongated portion 62 is generally configured to cooperate with the U-shaped first member 40. The handle portion 64 is preferably formed integrally with the elongated portion 62. In particular, the handle portion 64 of the second member 60 is preferably formed as a latch plate that defines an angle of approximately 20° with the elongated portion 62 as shown in FIG. 6. The second member 60 is pivotally connected to the first member 40 by a first pin 66 that extends through holes 68 in the flanges 42 of the first member 40 and mating holes 70 in the elongated portion 62 of the second member 60. An end fastener 72 is located at each end of the first pin 66 to pivotally connect the elongated portion 62 of the second member 60 to the first member 40. The elongated portion 62 of the second member 60 is positioned in the recess 44 defined by the flanges 42 of the first member 40. The pivotal connection between the elongated portion 62 of the second member 60 and the first member 40 permits the elongated portion 62 of the second member 60 to pivot in the recess 44 defined by the flanges 42 of the first member 40.

Figure 7:
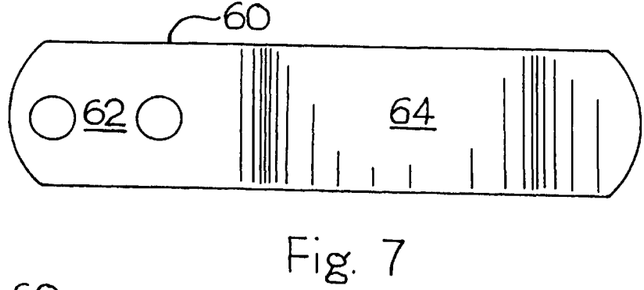
FIG. 7 is a top plan view of a second embodiment of the second member shown in FIG. 6.
Figure 8:
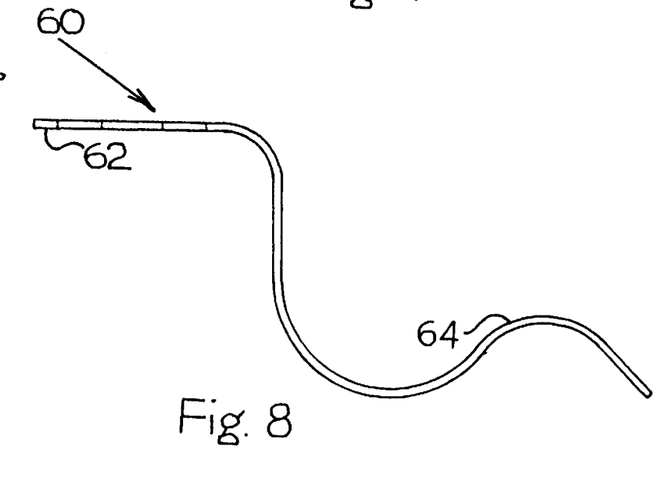
FIG. 8 is an elevational side view of the second member shown in FIG. 7.

Referring to FIGS. 7 and 8, a second embodiment of the second member 60 is shown. The second member 60 in FIGS. 7 and 8 is similar to the second member 60 shown in FIG. 6, but the elongated portion 62 is now formed as a flat plate and the latch plate 64 is substantially S-shaped. The shape of the latch plate 64 shown in FIG. 8 provides for an easier manipulation of the bed supports 14 by a user of the folding trailer 10.

Referring to FIGS. 4–9, the bed supports 14 each further include an elongated bed support member 80 having a first end 82 and a second end 84. The bed support member 80 is preferably a circular rod having an annular cross section. The first end 82 of the bed support member 80 is pivotally and slidably connected to the first member 40 by a second pin 86 that extends through the first end 82 and the slots 46 defined by the flanges 42 of the first member 40. An elastomeric bushing 88 is preferably located at each end of the second pin 86. Fasteners, such as a nut 90 and washer 92, are also received on the ends of the second pin 86 for retaining the elastomeric bushings 88 on the second pin 86 and, further, to pivotally connect the bed support member 80 to the first member 40. The first end 82 of the bed support member 80 is generally positioned within the recess 44 defined by the flanges 42 of the first member 40. A pair of spacer bushings 94 is preferably received on the second pin 86 and thus also located in the recess 44 defined by the flanges 42 of the first member 40. The spacer bushings 94 are positioned on opposite sides of the first end 82 of the bed support member 80. The second end 84 of the bed support member 80 is configured to attach to a connection member 96 that is located on the towing frame 24 extending from the front end wall 20F of the trailer body 16, or located on the bumper 22 extending from the rear end wall 20R of the trailer body 16.

Figure 9:
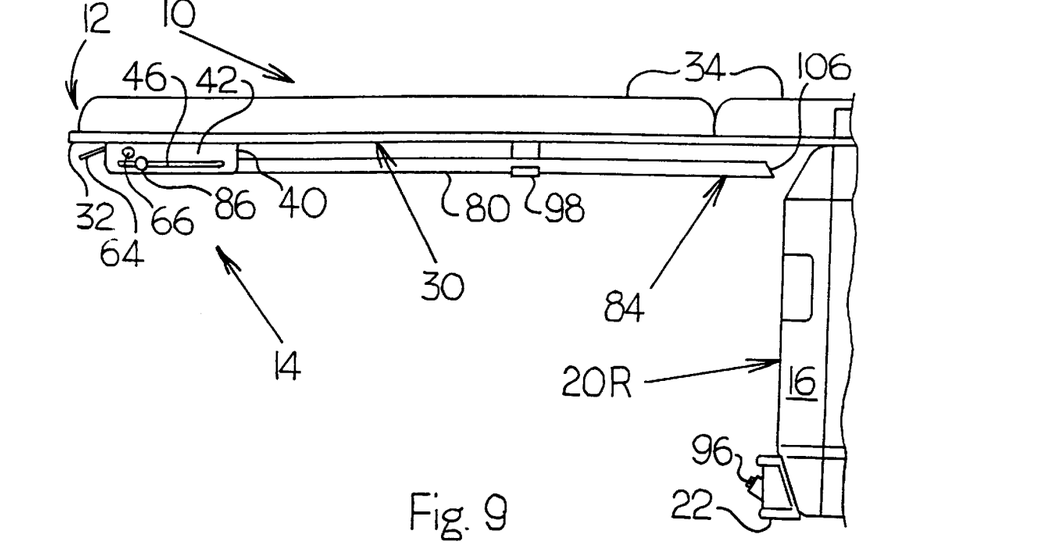
FIG. 9 is an elevational side view of a rear end of the folding camping trailer of FIG. 2 showing the bed support mechanism in a travel position.
Figure 10:
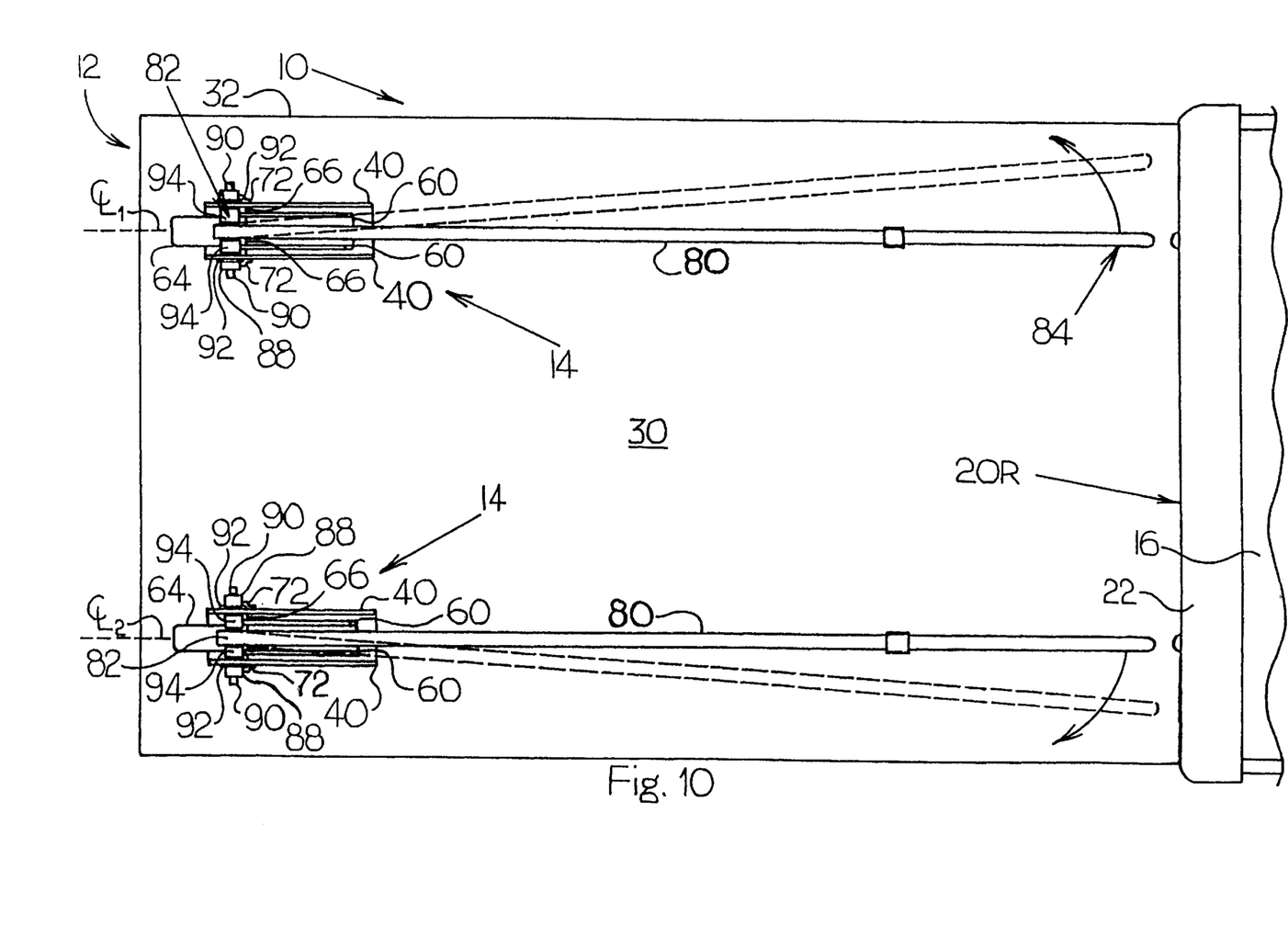
FIG. 10 is a bottom plan view of the rear end of the folding camping trailer of FIG. 2 showing lateral pivotal movement of the bed support mechanisms in broken lines.
Figure 11:
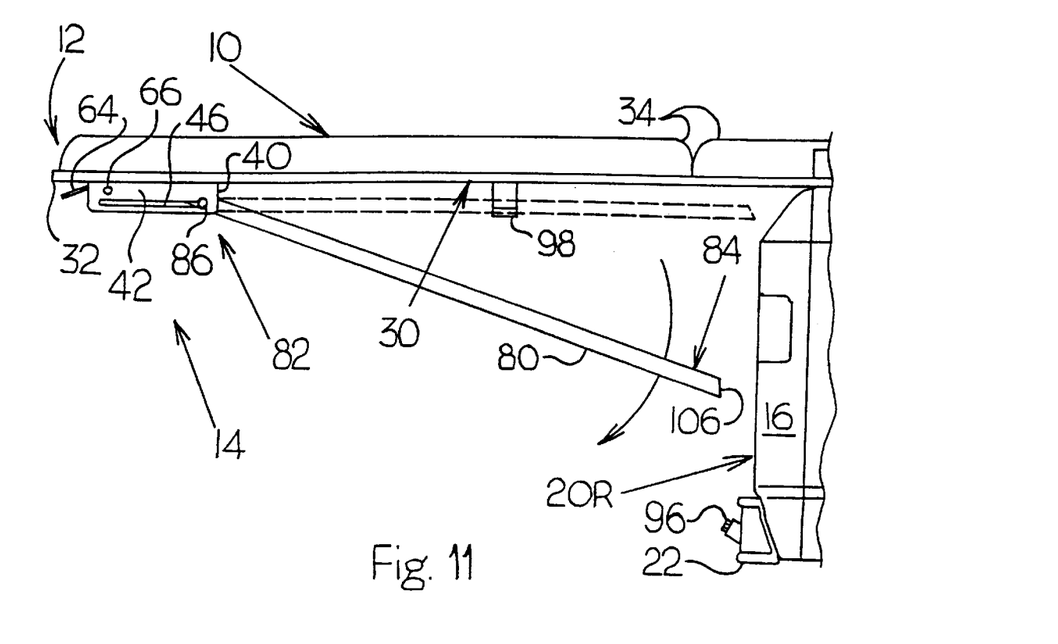
FIG. 11 is an elevational side view of the rear end of the folding camping trailer of FIG. 2 showing downward movement of one of the bed support mechanisms.

Referring to FIGS. 9–13, operation of one of the bed supports 14 located adjacent the rear end wall 20R of the folding trailer 10 will now be discussed. Each of the expandable beds 12 for the folding trailer 10 typically includes a pair of bed supports as shown, for example, in FIGS. 1 and 10. However, it will be appreciated by those skilled in the art that only one or more than two bed supports 14 may be necessary, for each of the expandable beds 12, depending on the size and weight of the expandable bed. The following discussion is with reference to one of the bed supports 14, with the second bed support 14 at the rear end of the folding trailer 10 shown in broken lines and retained in its travel position for clarity in FIGS. 11 and 12. Referring initially to FIG. 9, the bed support 14 is shown in a travel position with the bed support member 80 supported by a bracket 98 attached to the underside 30 of the expandable bed 12. The bracket 98 maintains the bed support member 80 in a substantially parallel relationship with the underside 30 of the expandable bed 12 so that the expandable bed 12 and the bed support 14 may be retracted together into the trailer body 16. With the bed support 14 in the travel position, the second pin 86 is free to slide in slots 46 defined by the flanges 42 of the first member 40 and generally supports the second member 60 in the recess 44. However, the bracket 98 is preferably configured to maintain the bed support member 80 in a fixed orientation with respect to the platform 32 of the expandable bed 12 so that the expandable bed 12 and the bed support 14 may be retracted together into the trailer body 16.

Figure 12:
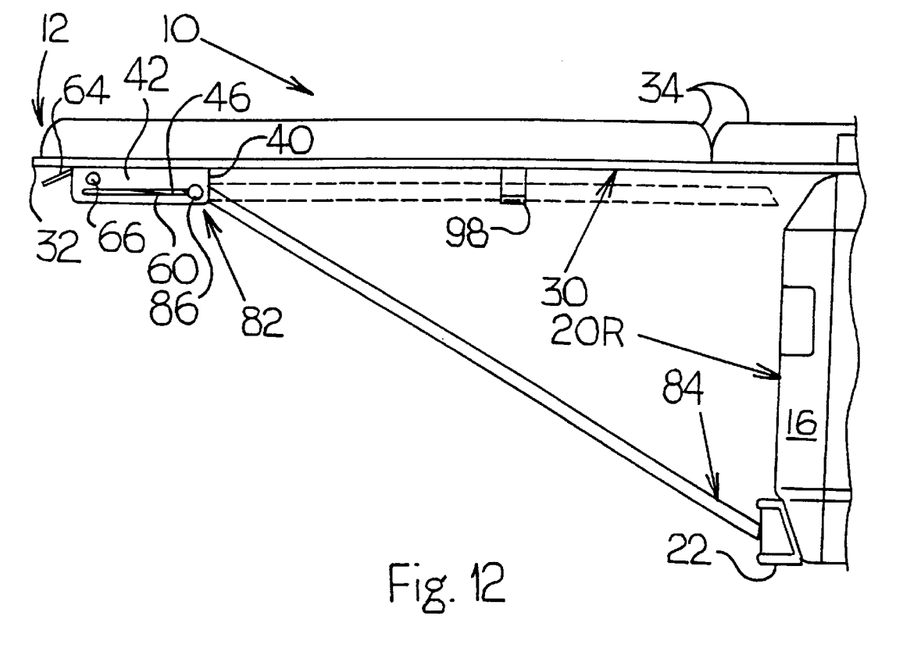
FIG. 12 is an elevational side view of the rear end of the folding camping trailer of FIG. 2 showing one of the bed support mechanisms in a set up position.

Referring now to FIGS. 9–12, when it is desired to place the bed support 14 in a set up position, the bed support member 80 is pivoted laterally with respect to a central longitudinal axis (($\mathcal{C}_1$, $\mathcal{C}_2$) of the first member 40 of the bed support 14. The user of the folding trailer 10 may accomplish this from a standing position. The second member 60 remains supported by the second pin 86 in recess 44, which may be referred to as a first position of the second member 60. The lateral pivotal movement of the bed support member 80 relative to the first member 40 is enabled by the use of the elastomeric bushings 88 located on each side of the first end 82 of the bed support member 80, and by leaving extra spacing between the various elements received on the second pin 86. As a result of the lateral pivotal movement of the bed support member 80, the bed support member 80 is detached from the bracket 98 and may be lowered into the set up position of the bed support 14 as shown in FIG. 12. Again, this may be accomplished from a standing position.

As the bed support member 80 is lowered toward the bumper 22, the user of the folding trailer 10 will simultaneously support the platform 32 of the expandable bed 12 and slide the first end 82 of the bed support member 80 toward the rear end wall 20R of the trailer body 16. The user of the folding trailer 10 may support the platform 32 with one hand while sliding the bed support member 80 with his or her other hand. Thus, the user may remain standing adjacent the expandable bed 12 during this phase of the set up procedure. The second pin 86 extending through the first end 82 of the bed support member 80 freely slides in the slots 46 defined by the flanges 42 of the first member 40 until the second pin 86 reaches the end of the slots 46. At this point, the elongated portion 62 of the second member 60 pivots downward under the force of gravity about the first pin 66 into a second position engaging the spacer bushings 94 (shown in FIG. 4) so that the second pin 86 and the first end 82 of the bed support member 80 cannot slide backward into the slots 46 away from the trailer body 16. Hence, in the second position of the second member 60, the elongated portion 62 of the second member 60 interacts with the second pin 86 and the spacer bushings 94 preferably positioned thereon. The spacer bushings 94, with the bed support 14 in the set up position and the second member 60 engaging the spacer bushings 94, will also substantially prevent the lateral pivotal movement of the bed support member 80 with respect to the first member 40.

Figure 13:
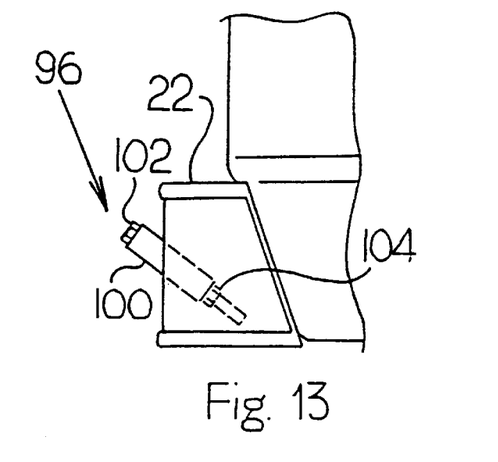
FIG. 13 is a detailed view of a point of connection between one of the bed support mechanisms and a bumper of the folding camping trailer of FIG. 2.
Figure 14:
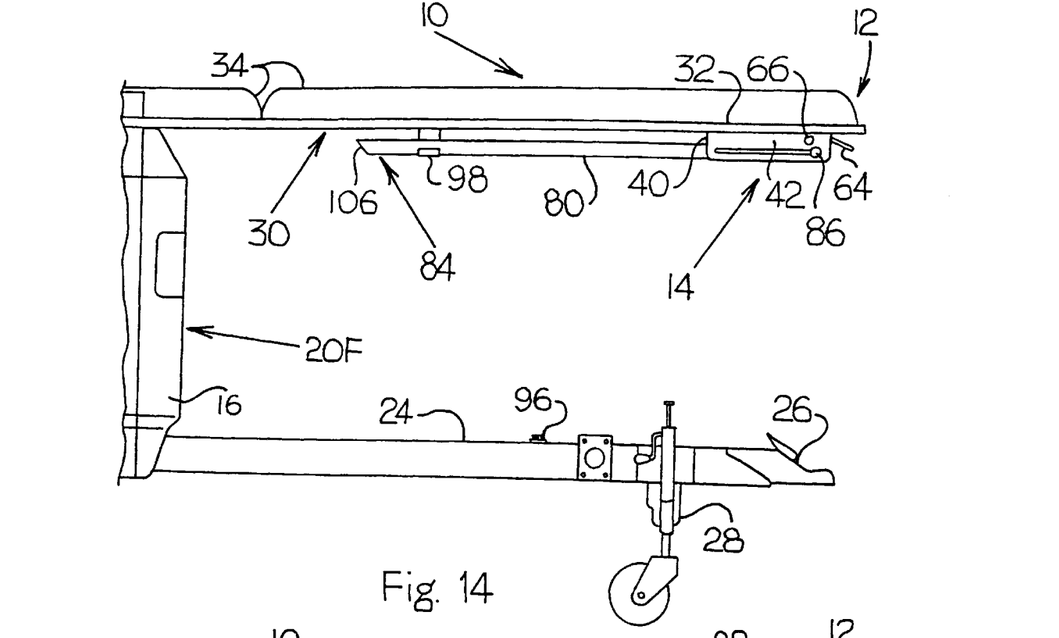
FIG. 14 is an elevational side view of a front end of the folding camping trailer of FIG. 2 showing the bed support mechanisms in a travel position.
Figure 15:
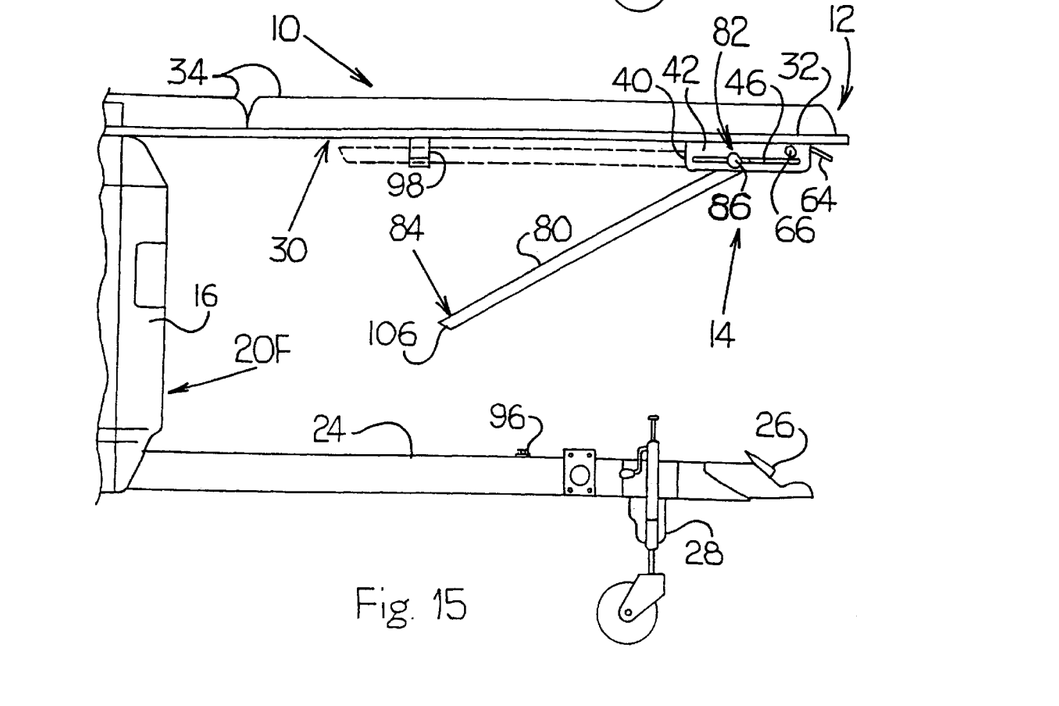
FIG. 15 is an elevational side view of the front end of the folding camping trailer of FIG. 2 showing downward movement of one of the bed support mechanisms.
Figure 16:
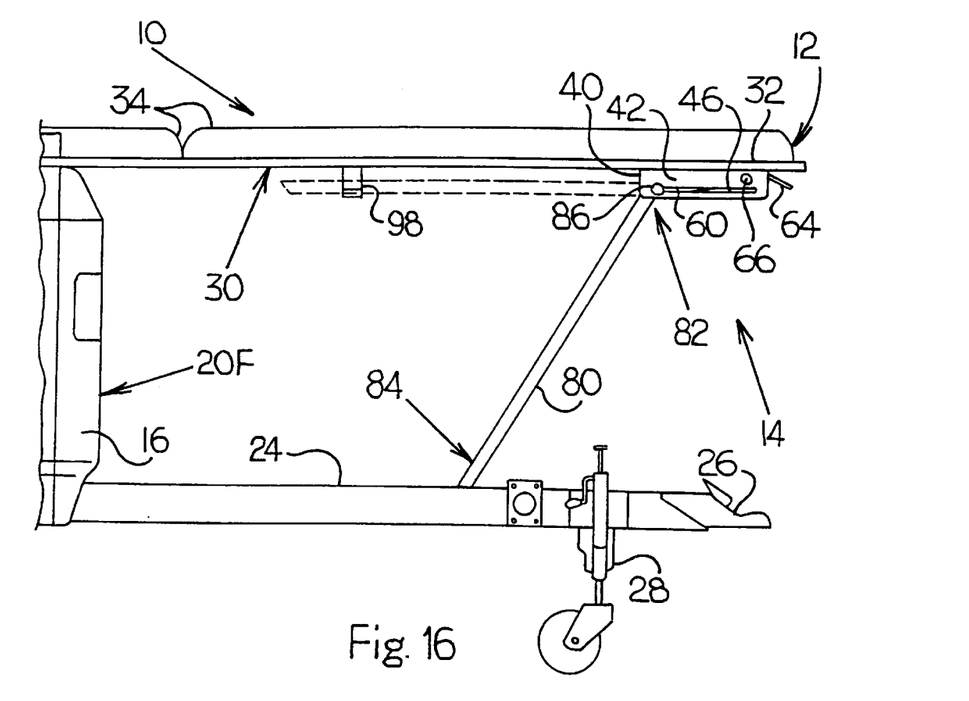
FIG. 16 is an elevational side view of the front end of the folding camping trailer of FIG. 2 showing one of the bed support mechanisms in the set up position.

The second end 84 of the bed support member 80 now easily cooperates with the connection member 96 attached to the bumper 22 extending from the rear end wall 20R of the trailer body 16. As shown in FIG. 13, the connection member 96 preferably includes a support tube 100 that extends through the bumper 22 and houses a bolt 102. A nut 104 may be located within the bumper 22 to fixedly connect the bolt 102 to the support tube 100. The annular cross section of the bed support member 80 receives the portion of the support tube 100 and the bolt 102 extending outward from the bumper 22. The second end 84 of the bed support member 80 is preferably beveled at approximately a 60° angle so that an end face 106 of the second end 84 of the bed support member 80 may engage the flat end face of the bumper 22 as shown in FIG. 12. Thus, the bed support member 80 generally defines an angle of approximately 30° with the underside 30 of the expandable bed 12, so that the expandable bed 12 generally remains in a substantially parallel relationship with the ground for the comfort of the user of the expandable bed 12.

The bed support 14 may be returned to the travel position shown in FIG. 9 by the user of the folding trailer 10 pressing down on the latch plate 64 of the second member 60 which causes the elongated portion 62 of the second member 60 to pivot upward in recess 44 defined by the first member 40 and out of engagement with the spacer bushings 94 received on the second pin 86. The second pin 86 and, hence, the first end 82 of the bed support member 80 may now slide backward in the slots 46 defined by the flanges 42 of the first member 40 away from the rear end wall 20R of the trailer body 16. The user then slides the second pin 86 and the first end 82 of the bed support member 80 backward in the slots 46, while simultaneously rotating bed support member 80 upward to detach the second end 84 from the connection member 96 attached to the bumper 22. The user of the folding trailer 10 then supports the expandable bed 12 while pivoting the bed support member 80 fully upward to reconnect the bed support member 80 with bracket 98. The expandable bed 12 may then be retracted into the trailer body 16 along with the bed support 14. Each step in the process of returning the expandable bed 12 to its travel position retracted into the trailer body 16 may be accomplished from the standing position, as will be appreciated by those skilled in the art.

Figure 17:
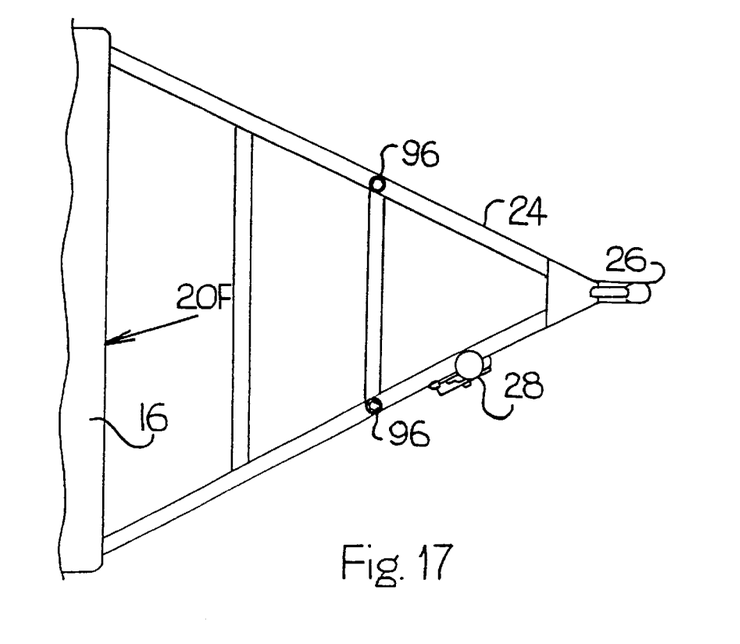
FIG. 17 is a top plan view of a towing frame of the folding camping trailer of FIG. 2.

FIGS. 14–17 illustrate the set up procedure for the bed supports 14 located adjacent the front end wall 20F of the folding trailer 10. The bed supports 14 located adjacent the front end wall 20F of the folding trailer 10 operate in a substantially similar manner to the bed supports 14 located adjacent the rear end 20R of the folding trailer 10, but the connection member 96 for each of the bed supports 14 is now attached to the towing frame 24. The connection members 96 attached to the towing frame are preferably threaded rods that engage apertures defined in the towing frame 24. FIG. 17 is a top plan view of the towing frame 24 illustrating locations for the connection members 96 at the front end of the folding trailer 10. The end face 106 of the bed support member 80 for each of the bed supports 14 at the front end of the trailer body 16 is also beveled at approximately a 60° angle, but now in the opposite direction to the bed support member 80 of the bed supports 14 located at the rear end of the trailer body 16. The bed supports 14 at the front end of the trailer body 16 may be returned to their travel position in a substantially similar manner to the bed supports 14 located adjacent the rear end of the folding trailer 10 discussed previously.

The present invention provides a folding camping trailer with expandable beds having simplified and cost-effective bed support mechanisms for supporting the expandable beds in their opened position. In addition, the bed support mechanisms made in accordance with the present invention make set up of expandable beds in folding camping trailers easier and less labor intensive because the users of the folding camping trailer may operate the bed support mechanisms entirely from a standing position. This causes less stress on the backs of users of the folding camping trailer. The users no longer need to crouch under the expandable beds to support them during the set up procedure. Thus those individuals who do not have sufficient muscle strength or mobility to operate "traditional" bed support devices can easily operate the bed support mechanisms of the present invention. Furthermore, the bed support mechanisms in accordance with the present invention overcome the previously discussed deficiencies with prior art bed support arrangements. The bed support mechanisms of the present invention are permanently attached at one end to the folding camping trailer and, therefore, cannot become misplaced or damaged. The simplified design of the bed support mechanisms of the present invention overcomes the "jamming" problems associated with certain more complicated bed support devices found in the prior art.

Obvious modifications and alterations of the invention may be made without departing from the spirit and scope of the present invention. The scope of the present invention is defined by the appended claims and equivalents thereto.

I claim:

1. A bed support mechanism for use with an expandable bed of a folding camping trailer, comprising:
    a first member having two opposing flanges defining a recess therebetween, with the flanges further defining opposing longitudinally extending slots;
    a second member having an elongated portion and a handle portion, with the elongated portion of the second member pivotally connected to the first member and positioned within the recess, and with the handle portion projecting outward from the first member for manipulation by a user of the folding camping trailer; and
    an elongated bed support member having a first end and a second end, with the first end pivotally and slidably connected to the first member by a pin passing through the first end and the slots defined by the flanges, and with the second end configured for removable attachment to a body of the folding camping trailer,
    wherein in a first position of the second member the pin is free to slide in the slots defined by the flanges, and
    wherein in a second position of the second member the elongated portion of the second member interacts with the pin passing through the first end of the bed support member to prevent the pin from sliding in the slots defined by the flanges.

2. The bed support mechanism of claim 1, further including an elastomeric bushing at each end of the pin such that with the second member in the first position, the bed support member is pivotal laterally with respect to a central longitudinal axis of the first member.

3. The bed support mechanism of claim 2, further including a fastener at each end of the pin for retaining the elastomeric bushings on the pin and securing the bed support member to the first member.

4. The bed support mechanism of claim 3, further including a pair of spacer bushings received on the pin and positioned in the recess, with the spacer bushings positioned on opposite sides of the first end of the bed support member, and wherein with the second member in the second position the elongated portion engages the spacer bushings which substantially prevent the pivotal lateral movement of the bed support member.

5. The bed support mechanism of claim 1, wherein the first member and the elongated portion of the second member are formed as cooperating U-shaped channels.

6. The bed support mechanism of claim 5, wherein the handle portion of the second member is a latch plate forming an angle with the elongated portion.

7. The bed support mechanism of claim 6, wherein the bed support member is a rod having an annular cross section.

8. An expandable bed for a folding camping trailer, comprising:
    a bed platform; and
    a bed support mechanism attached to a bottom side of the bed platform, with the bed support mechanism further comprising:
        a first member having two opposing flange members defining a recess therebetween, with the flanges further defining opposing longitudinally extending slots;
        a second member having an elongated portion and a handle portion, with the elongated portion of the second member pivotally connected to the first member and positioned within the recess, and with the handle portion projecting outward from the first member for manipulation by a user of the folding, camping trailer; and an elongated bed support member having a first end and a second end, with the first end pivotally and slidably connected to the first member by a pin passing through the first end and the slots defined by the flanges, and with the second end configured for removable attachment to a body of the folding camping trailer, wherein in a first position of the second member the pin is free to slide in the slots defined by the flanges, and wherein in a second position of the second member the elongated portion of the second member interacts with the pin passing through the first end of the bed support member to prevent the pin from sliding in the slots defined by the flanges.

9. The expandable bed of claim 8, further including an elastomeric bushing at each end of the pin such that with the second member in the first position, the bed support member is pivotal laterally with respect to a central longitudinal axis of the first member.

10. The expandable bed of claim 9, further including a fastener at each end of the pin for retaining the elastomeric bushing on the pin and securing the bed support member to the first member.

11. The expandable bed of claim 10, further including a pair of spacer bushings received on the pin and positioned in the recess, with the spacer bushings positioned on opposite sides of the first end of the bed support member, and wherein with the second member in the second position the elongated portion engages the spacer bushings which substantially prevent the pivotal lateral movement of the bed support member.

12. The expandable bed of claim 8, wherein the first member and the elongated portion of the second member are formed as cooperating U-shaped channels.

13. The expandable bed of claim 12, wherein the handle portion of the second member is a latch plate forming an angle with the elongated portion.

14. The expandable bed of claim 13, wherein the bed support member is a rod having an annular cross section.

15. A folding camping trailer, comprising:

a trailer body having an end wall and a towing frame;

an expandable bed movable between a closed position retracted within the trailer body and an opened position extended outward from the end wall; and a bed support mechanism attached to a bottom side of the expandable bed for supporting the expandable bed in a vertical direction with the expandable bed in the opened position, wherein the bed support mechanism further comprises:

a first member having two opposing flanges defining a recess therebetween, with the flanges further defining opposing longitudinally extending slots;

a second member having an elongated portion and a handle portion, with the elongated portion of the second member pivotally connected to the first member and positioned within the recess, and with the handle portion projecting outward from the first member for manipulation by a user of the folding camping trailer; and an elongated bed support member having a first end and a second end, with the first end pivotally and slidably connected to the first member by a pin passing through the first end and the slots defined by the flanges, and with the second end configured for removable attachment to the trailer body with the expandable bed in the opened position, wherein in a first position of the second member the pin is free to slide in the slots defined by the flanges, and wherein in a second position of the second member the elongated portion of the second member interacts with the pin passing through the first end of the bed support member to prevent the pin from sliding in the slots defined by the flanges.

16. The folding camping trailer of claim 15, further including an elastomeric bushing at each end of the pin such that with the second member in the first position, the bed support member is pivotal laterally with respect to a central longitudinal axis of the first member.

17. The folding camping trailer of claim 16, further including a fastener at each end of the pin for retaining the elastomeric bushings on the pin and securing the bed support member to the first member.

18. The folding camping trailer of claim 17, further including a pair of spacer bushings received on the pin and positioned in the recess, with the spacer bushings positioned on opposite sides of the first end of the bed support member, and wherein with the second member in the second position the elongated portion engages the spacer bushings which substantially prevent the pivotal lateral movement of the bed support member.

19. The folding camping trailer of claim 15, wherein the second end of the bed Support member is configured to removably attach to the end wall of the trailer body.

20. The folding camping trailer of claim 15, wherein the towing frame is located adjacent the end wall, wherein the second end of the bed support member is configured to removably attach to the towing frame.

* * * * *

UNITED STATES PATENT AND TRADEMARK OFFICE
CERTIFICATE OF CORRECTION

PATENT NO. : 6,203,097 B1
DATED : March 20, 2001
INVENTOR(S) : Thomas R. Podgorney It is certified that error appears in the above-identified patent and that said Letters Patent is hereby corrected as shown below:

Column 3,
Line 13, "set tip" should read -- set up --.

Column 4,
Line 45, after "having an" delete -- is --.

Column 5,
Line 65, "((" should read -- ( --.

Claims,
Column 9, claim 8,
Line 1, after "folding" delete comma (,).--.

Column 10, claim 19,
Line 44, "bed Support" should read -- bed support --.

Signed and Sealed this

Thirtieth Day of October, 2001

*Attest:*

NICHOLAS P. GODICI
*Attesting Officer*  Acting Director of the United States Patent and Trademark Office